(12) United States Patent  
Delano et al.

(10) Patent No.: US 7,522,433 B2
(45) Date of Patent: Apr. 21, 2009

(54) EFFICIENT VOLTAGE RAIL GENERATION

(75) Inventors: Cary L. Delano, Los Altos, CA (US); William R. Chester, Morgan Hill, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 17 days.

(21) Appl. No.: 11/688,835

(22) Filed: Mar. 20, 2007

(65) Prior Publication Data

US 2008/0157855 A1 Jul. 3, 2008

Related U.S. Application Data

(60) Provisional application No. 60/784,638, filed on Mar. 21, 2006.

(51) Int. Cl.
*H02M 3/18* (2006.01)
(52) U.S. Cl. ............................... 363/60; 363/59
(58) Field of Classification Search ............... 363/59, 363/60; 327/535, 536
See application file for complete search history.

(56) References Cited

U.S. PATENT DOCUMENTS

| | | | |
|---|---|---|---|
| 4,030,045 A | 6/1977 | Clark | |
| 4,324,950 A | 4/1982 | Strickland | |
| 5,038,325 A | 8/1991 | Douglas et al. | |
| 5,072,171 A | 12/1991 | Eng | |
| 5,111,375 A * | 5/1992 | Marshall | 363/60 |
| 5,115,203 A | 5/1992 | Krett et al. | |
| 5,347,171 A | 9/1994 | Cordoba et al. | |
| 5,491,839 A | 2/1996 | Schotz | |
| 5,694,072 A | 12/1997 | Hsiao | |
| 6,107,886 A | 8/2000 | Kusakabe | |
| 6,215,356 B1 | 4/2001 | Servaes et al. | |
| 6,256,482 B1 | 7/2001 | Raab | |
| 6,278,332 B1 * | 8/2001 | Nelson et al. | 331/17 |
| 6,304,138 B1 | 10/2001 | Johnson | |
| 6,323,729 B1 | 11/2001 | Sevenhans et al. | |
| 6,417,736 B1 | 7/2002 | Lewyn | |

(Continued)

FOREIGN PATENT DOCUMENTS

| WO | WO 97/23005 A1 | 6/1997 |
|---|---|---|
| WO | WO 00/00983 A1 | 1/2000 |

OTHER PUBLICATIONS

"TDA7563 Multifunction Quad Power Amplifier with Built-In Diagnostics Features," May 2003. ST Microelectronics.

(Continued)

*Primary Examiner*—Matthew V Nguyen
(74) *Attorney, Agent, or Firm*—Townsend and Townsend and Crew LLP; Kenneth R. Allen

(57) ABSTRACT

A voltage reference generation circuit having switch pairs coupled to systematically commutate a flying capacitor among adjacent pairs of voltage rail outputs. The circuit requires only a single flying capacitor, N+1 switch pairs, and N storage capacitors, to generate N intermediate voltage references between VDD and GND. A signal generator produces N+1 non-overlapping switch enable signals to systematically enable the switch pairs and commutate the single flying capacitor between the rail pairs. The flying capacitor remains charged to VDD/(N+1). The N storage capacitors hold their respective reference outputs at VDD*N/(N+1), VDD*(N−1)/(N+1), VDD*(N−2)/(N+1), and so forth.

20 Claims, 6 Drawing Sheets

U.S. PATENT DOCUMENTS

| | | |
|---|---|---|
| 6,486,733 B2 | 11/2002 | Myers et al. |
| 6,504,426 B2 | 1/2003 | Picha et al. |
| 6,538,514 B2 | 3/2003 | Harvey |
| 6,614,310 B2 | 9/2003 | Quarfoot et al. |
| 6,636,103 B2 | 10/2003 | Wurcer et al. |
| 6,677,789 B1 * | 1/2004 | Svard .......................... 327/157 |
| 6,815,988 B2 | 11/2004 | Sanduleanu |
| 6,838,942 B1 | 1/2005 | Somerville et al. |
| 6,853,244 B2 | 2/2005 | Robinson et al. |
| 6,975,175 B2 | 12/2005 | Sanduleanu |
| 6,980,045 B1 * | 12/2005 | Liu ............................ 327/536 |
| 6,982,600 B2 | 1/2006 | Harvey |
| 6,987,417 B2 | 1/2006 | Winter et al. |
| 6,993,302 B2 | 1/2006 | Bausov et al. |
| 6,998,914 B2 | 2/2006 | Robinson |
| 7,026,868 B2 | 4/2006 | Robinson et al. |
| 7,034,614 B2 | 4/2006 | Robinson et al. |
| 7,042,284 B2 | 5/2006 | Moons et al. |
| 7,043,213 B2 | 5/2006 | Robinson et al. |
| 7,106,135 B2 | 9/2006 | Makino et al. |

OTHER PUBLICATIONS

MAX9730 2.4W, Single-Supply, Class G Amplier, Dec. 2006, Maxim Integrated Products.
International Search Report PCT/US07/064546.
International Search Report PCT/US07/064549.
International Search Report PCT/US07/064548.
International Search Report PCT/US07/064545.
International Search Report PCT/US07/064543.

* cited by examiner

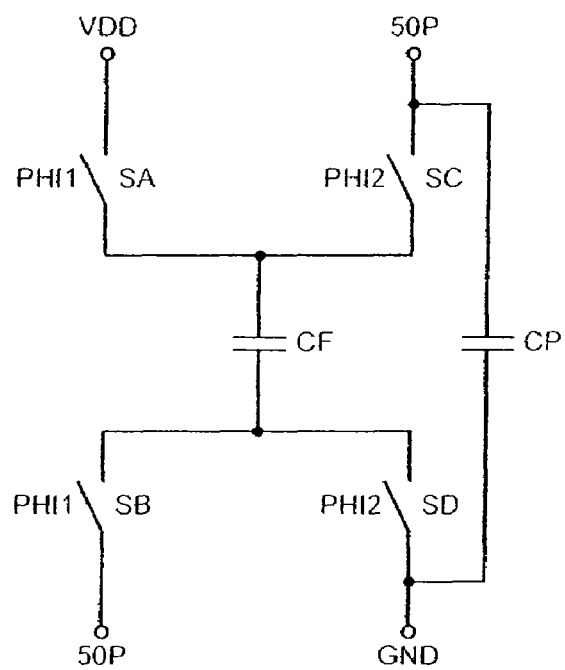
Fig. 1 – prior art
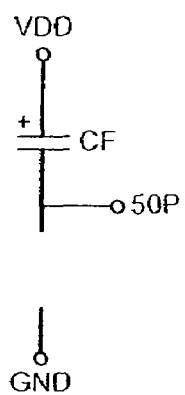
Fig. 2 – prior art
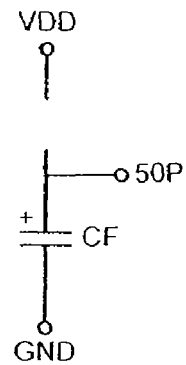
Fig. 3 – prior art

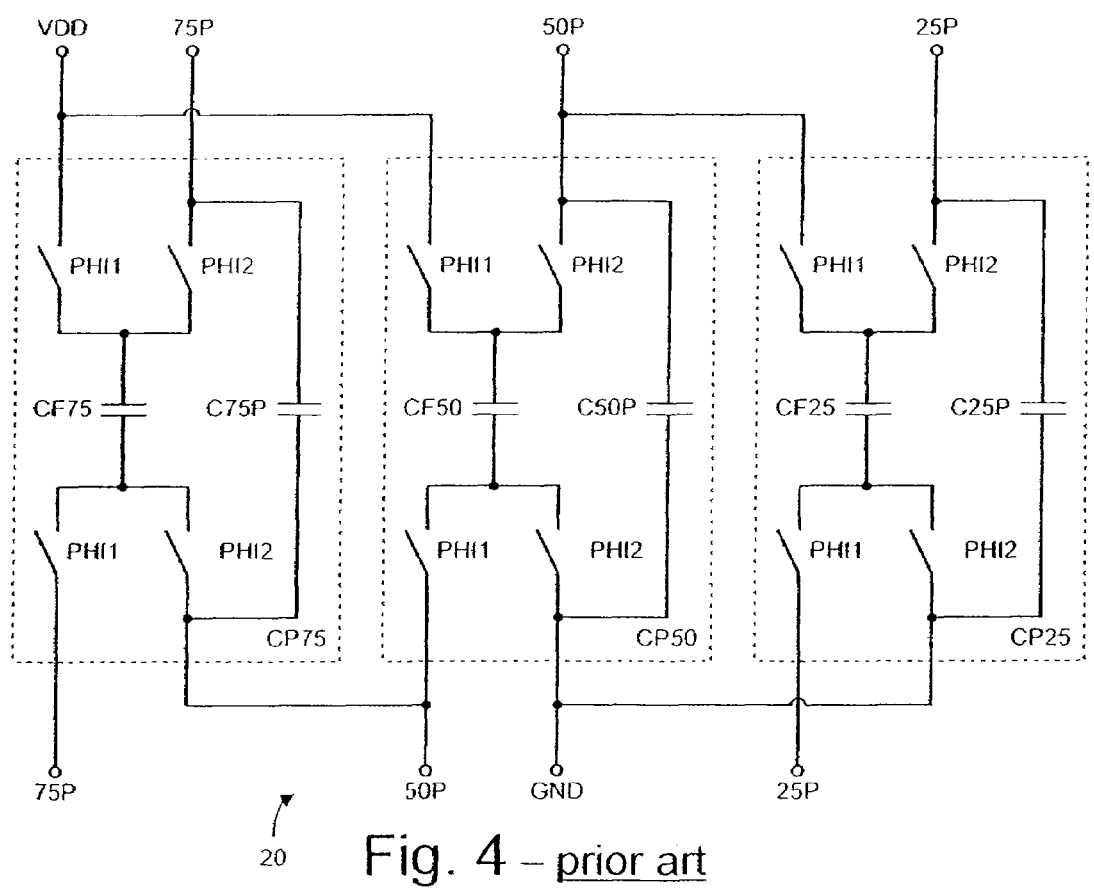
Fig. 4 – prior art

EFFICIENT VOLTAGE RAIL GENERATION

RELATED APPLICATION

The present application claims benefit under 35 USC 119 (e) of U.S. provisional Application No. 60/784,638, filed on Mar. 21, 2006, entitled "Adaptive Biasing Based on Volume Control Setting," the content of which is incorporated herein by reference in its entirety.

BACKGROUND OF THE INVENTION

1. Technical Field of the Invention

This invention relates generally to circuits for generating voltage rails, and more specifically to an improved charge pump for generating voltage rails.

2. Background Art

FIG. 1 illustrates a charge pump circuit 10 which is known in analog and power semiconductor design. The charge pump is built around a flying capacitor CF, four controllable switches S1 to S4, and capacitor CP. The capacitor CP can be referred to as a storage or bypass capacitor. A first switch SA and a third switch SC are coupled to a first terminal of the flying capacitor, and a second switch SB and a fourth switch SD are coupled to a second terminal of the flying capacitor. The first and second switches are operated together by a first phase control signal PHI1, and the third and fourth switches are operated together by a second phase control signal PHI2. The phase control signals are typically operated as binary clock signals 180° out of phase, and can be a clock signal and an inverted version of that clock signal with the addition of some dead time at each transition, when no switch is on. The dead time is important, to ensure that SB and SD do not produce a short between 50P and GND, and to ensure that SA and SC do not produce a short between VDD and 50P.

The first switch un/couples the first terminal of the flying capacitor from/to the VDD voltage reference supply. The fourth switch un/couples the second terminal of the flying capacitor from/to the ground (GND) voltage reference supply. The second switch un/couples the second terminal of the flying capacitor from/to an output terminal 50P at which the charge pump generates VDD/2. And the third switch un/couples the first terminal from/to the output terminal. The storage capacitor CP is coupled between the output terminal and the ground voltage reference supply in order to store the charge packets delivered by CF and to smooth the voltage at 50P.

FIGS. 2 and 3 show the two charge pump states (during assertion of PHI1, and assertion of PHI2, respectively) of the charge pump of FIG. 1. During PHI1, the flying capacitor is effectively coupled between VDD and the output node. During PHI2, the flying capacitor is effectively coupled between the output node and GND.

FIG. 4 illustrates a voltage rail generation circuit 20 according to the prior art. In addition to the voltage reference inputs VDD and GND, the voltage rail generation circuit uses three of the FIG. 1 charge pumps CP50, CP75, and CP25 to generate three intermediate voltage rails: VDD*0.50 at terminal 50P, VDD*0.75 at terminal 75P, and VDD*0.25 at terminal 25P, respectively. The primary charge pump CP50 is coupled to VDD and GND, and generates an output voltage equal to (VDD+GND)/2. The second charge pump CP75 is coupled to VDD and CP50, and generates an output voltage equal to (VDD+CP50)/2. The third charge pump CP25 is coupled to CP50 and GND, and generates an output voltage equal to (CP50+GND)/2.

Unfortunately, each of the charge pumps requires its own, dedicated flying capacitor (CF50, CF75, and CF25) and its own storage capacitor (C50P, C75P, and C25P). What is needed is an improved voltage rail generation circuit which does not require a dedicated flying capacitor for every voltage rail generated, while still maintaining the high efficiencies that charge pumps can obtain. It is desirable to minimize the flying capacitors, because they tend to have tighter ESR requirements than the storage capacitors and when integrated into an integrated circuit each flying capacitor requires two added pins which increases the cost of the integrated circuit.

BRIEF DESCRIPTION OF THE DRAWINGS

FIG. 1 shows a charge pump according to the prior art, for generating a VDD/2 voltage rail.

FIGS. 2 and 3 show the two states of the charge pump of FIG. 1.

FIG. 4 shows a circuit for generating VDD*0.75, VDD*0.50, and VDD*0.25 voltage rails, according to the prior art.

DETAILED DESCRIPTION

The invention will be understood more fully from the detailed description given below and from the accompanying drawings of embodiments of the invention which, however, should not be taken to limit the invention to the specific embodiments described, but are for explanation and understanding only.

Figure 5:
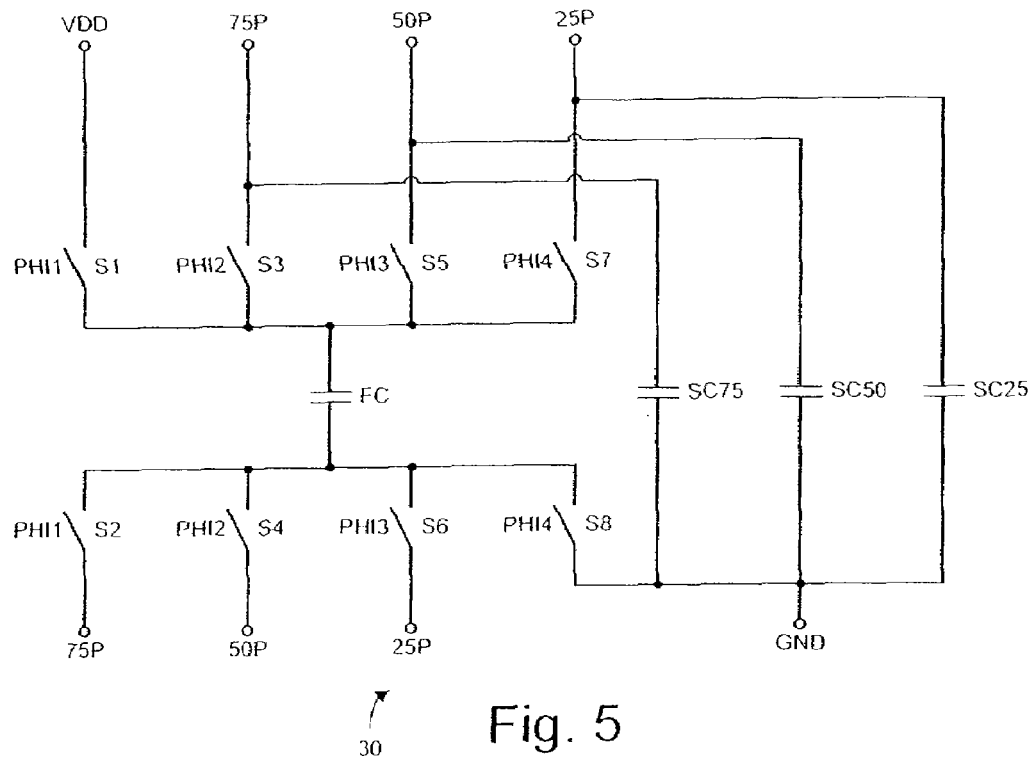
FIG. 5 shows an improved voltage rail generation circuit according to one embodiment of this invention.
Figure 6:
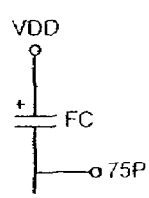
FIGS. 6-9 show the four states of the circuit of FIG. 5.
Figure 7:
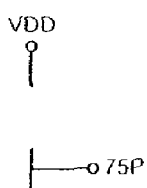
Figure 8:
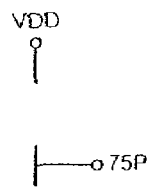
Figure 9:
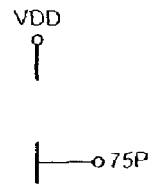

FIG. 5 shows a voltage rail generation circuit 30 according to one embodiment of this invention. The circuit includes a single flying capacitor FC, eight switches S1 to S8, and three storage capacitors SC75, SC50, and SC25. The first switch S1, third switch S3, fifth switch S5, and seventh switch S7 are coupled to a first terminal of the flying capacitor, and the second switch S2, fourth switch S4, sixth switch S6, and eighth switch S8 are coupled to a second terminal of the flying capacitor.

The first switch un/couples the first flying capacitor from/to a VDD voltage reference input terminal. The second switch un/couples the flying capacitor from/to a first voltage rail output terminal 75P at which the circuit generates VDD*0.75. The third switch un/couples the flying capacitor from/to the first voltage rail terminal. The fourth switch un/couples the flying capacitor from/to a second voltage rail output terminal 50P at which the circuit generates VDD*0.50. The fifth switch un/couples the flying capacitor from/to the second voltage rail output terminal. The sixth switch un/couples the flying capacitor from/to a third voltage rail output terminal 25P at which the circuit generates VDD*0.25. The seventh switch un/couples the flying capacitor from/to the third voltage rail output terminal. And the eighth switch un/couples the flying capacitor from/to a ground voltage reference input terminal GND.

A first storage capacitor SC75 is coupled between the first voltage rail output terminal and ground. A second storage capacitor SC50 is coupled between the second voltage rail output terminal and ground. And a third storage capacitor SC25 is coupled between the third voltage rail output terminal and ground. These storage capacitors store the charge packets delivered by CF1 and smooth the voltage at each respective supply voltage.

FIGS. 6 through 9 illustrate the four states of the circuit of FIG. 5. During PHI1, the flying capacitor is coupled between VDD and the 75P output terminal. During PHI2, the flying capacitor is coupled between the 75P output terminal and the 50P output terminal. During PHI3, the flying capacitor is coupled between the 50P output terminal and the 25P output terminal. And during PHI4, the flying capacitor is coupled between the 25P output terminal and GND. Thus, at any moment in time, the flying capacitor carries a potential of VDD*0.25. The switches move this reference voltage around among the output terminals.

The new circuit uses only a single flying capacitor, whereas the prior art required three flying capacitors to generate this same set of voltage rails. The new circuit generates N−1 supply rails, where N is the number of states (or switched positions) of the flying capacitor. Adding another voltage rail requires simply adding an additional pair of switches, an additional phase signal, and an additional storage capacitor. The single flying capacitor may, in some embodiments, be implemented as two or more smaller capacitors coupled in parallel, which is well known to be the functional equivalent of a single larger capacitor. In this context, "single" really means that the switches are all commonly coupled to the same one or more parallel flying capacitor(s).

The prior art technique can be used to generate $2^M-1$ voltage rails (in addition to the VDD and GND input reference voltages), where M is a positive integer, and requires $2^M-1$ flying capacitors, $4*2^M-1$ switches, $2^M-1$ storage capacitors, and 2 switch control signals (which can be 1 non/inverted clock signal with dead time control).

The technique of the present invention can be used to generate N voltage rails (in addition to the VDD and GND input reference voltages), where N is a positive integer greater than 2, and requires only 1 flying capacitor, 2*(N+1) switches, and N storage capacitors. It does, however, require N+1 switch control signals, because N+1 is the number of states (or switched positions) of the single flying capacitor. Fortunately, control signals are easy to add because they are done with small digital gates. The savings on the power switches is very important because the die area saved helps overall product cost. Also, the fact that fewer flying capacitors are used saves on pin count and external capacitor count which is also important for overall cost.

Figure 10:
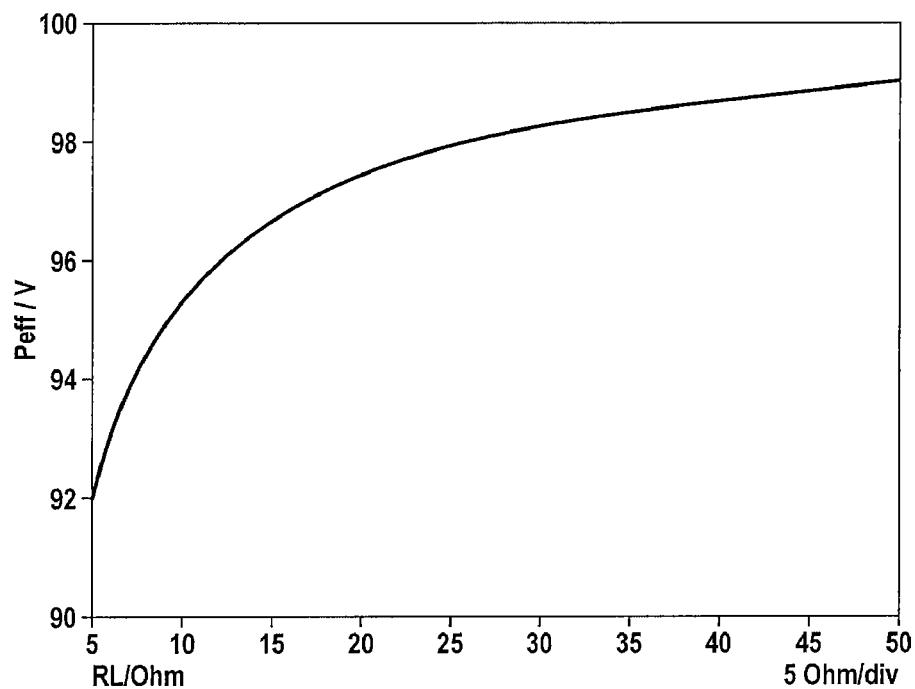
FIG. 10 shows results of a power efficiency simulation of the circuit of FIG. 5.

FIG. 10 is a chart illustrating the results of a power efficiency simulation of the circuit of FIG. 5. The chart shows power efficiency (vertical axis) versus resistive load (horizontal axis), with the load driven by a 1.5v voltage rail generated at the 50P terminal, and VDD set at 3.0v. The impedance of each switch was modeled as 0.25Ω.

An additional benefit of this invention is the lowering of output impedance when the load is applied across two of the generated rails (rather than across one of the generated rails and GND).

Figure 11:
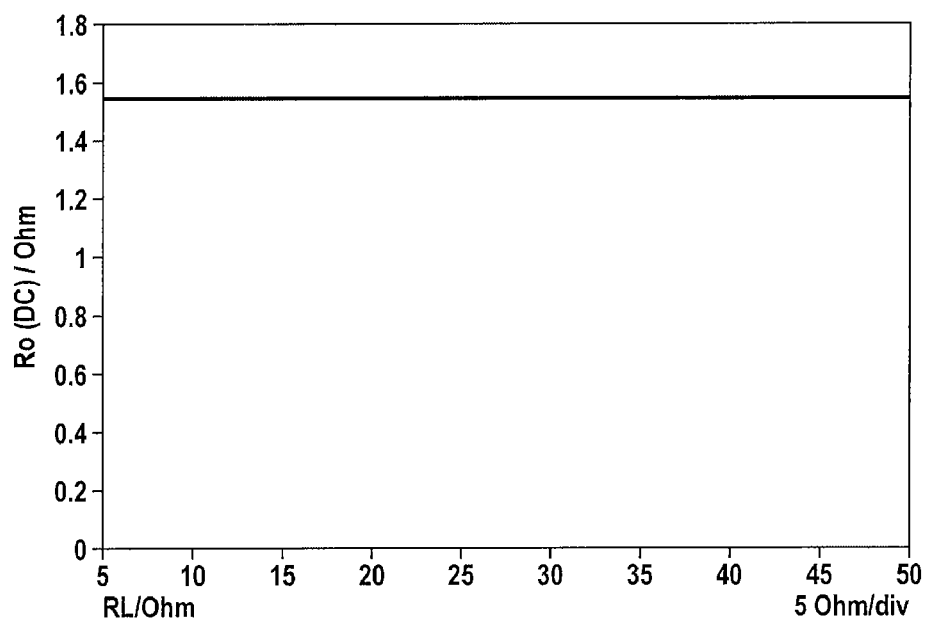
FIGS. 11 and 12 show results of output impedance simulations of the circuit of FIG. 5.

FIG. 11 is a chart showing the DC output impedance of the 75P rail when the load is connected between an ideal 1.5v VDD and the 75P terminal (at 2.25v). The simulation shows an impedance of ~1.56Ω.

Figure 12:
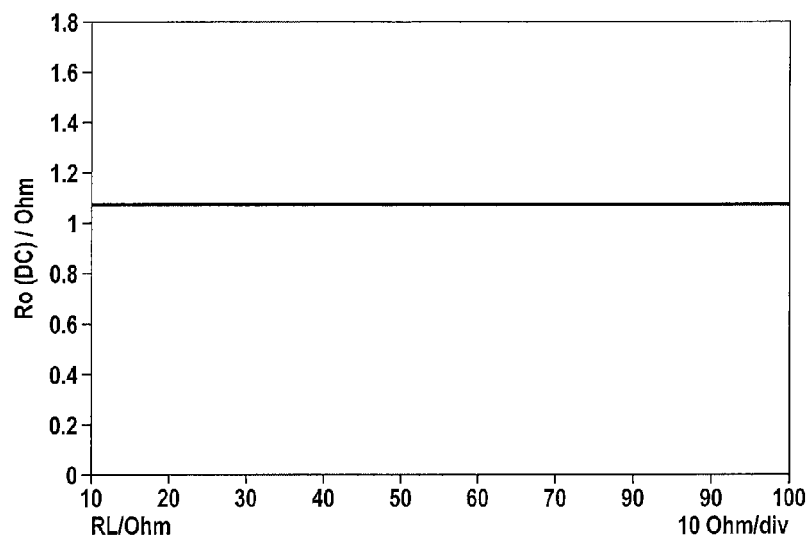

FIG. 12 is a chart showing the DC output impedance of the 75P rail when the resistive load is connected from the 75P rail (at 2.25v) to the 25P rail (at 0.75v). This simulation shows an output impedance of ~1.07Ω, which is a 31.4% reduction versus the ~1.56Ω impedance of FIG. 11.

Pulse skipping techniques can be used in conjunction with the circuit of FIG. 5, equally as well as they can be used in conjunction with the prior art circuit of FIG. 1.

Figure 13:
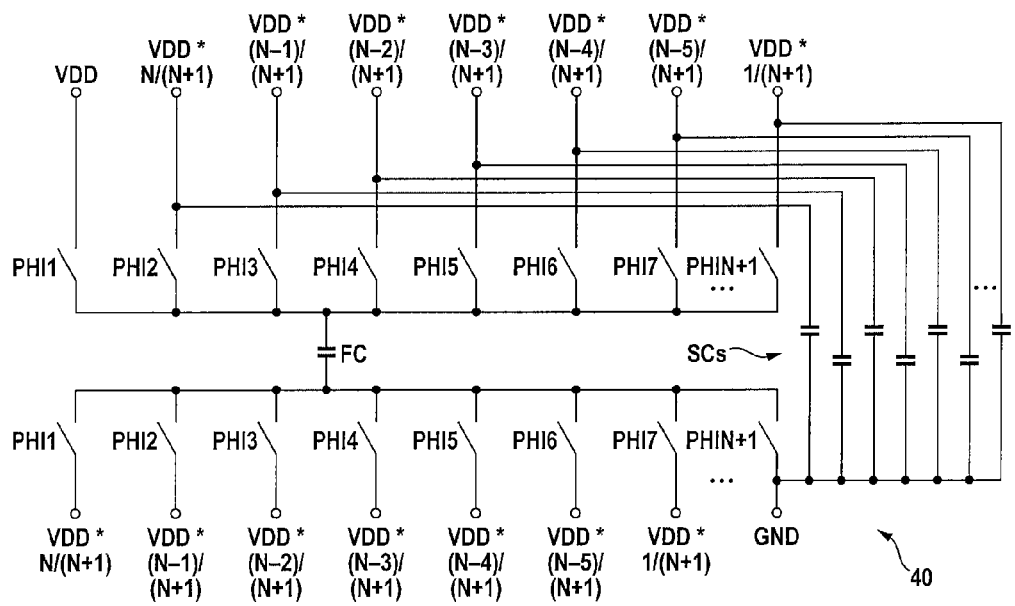
FIG. 13 shows a generalized voltage rail generation circuit according to one embodiment of this invention.

FIG. 13 illustrates the extension of the technique of this invention to an arbitrary number N of generated voltage rails (in addition to the VDD and GND input reference voltages), where N is a positive integer greater than 2. The circuit 40 requires only 1 flying capacitor, 2*(N+1) switches, N storage capacitors, and N+1 switch control signals.

Figure 14:
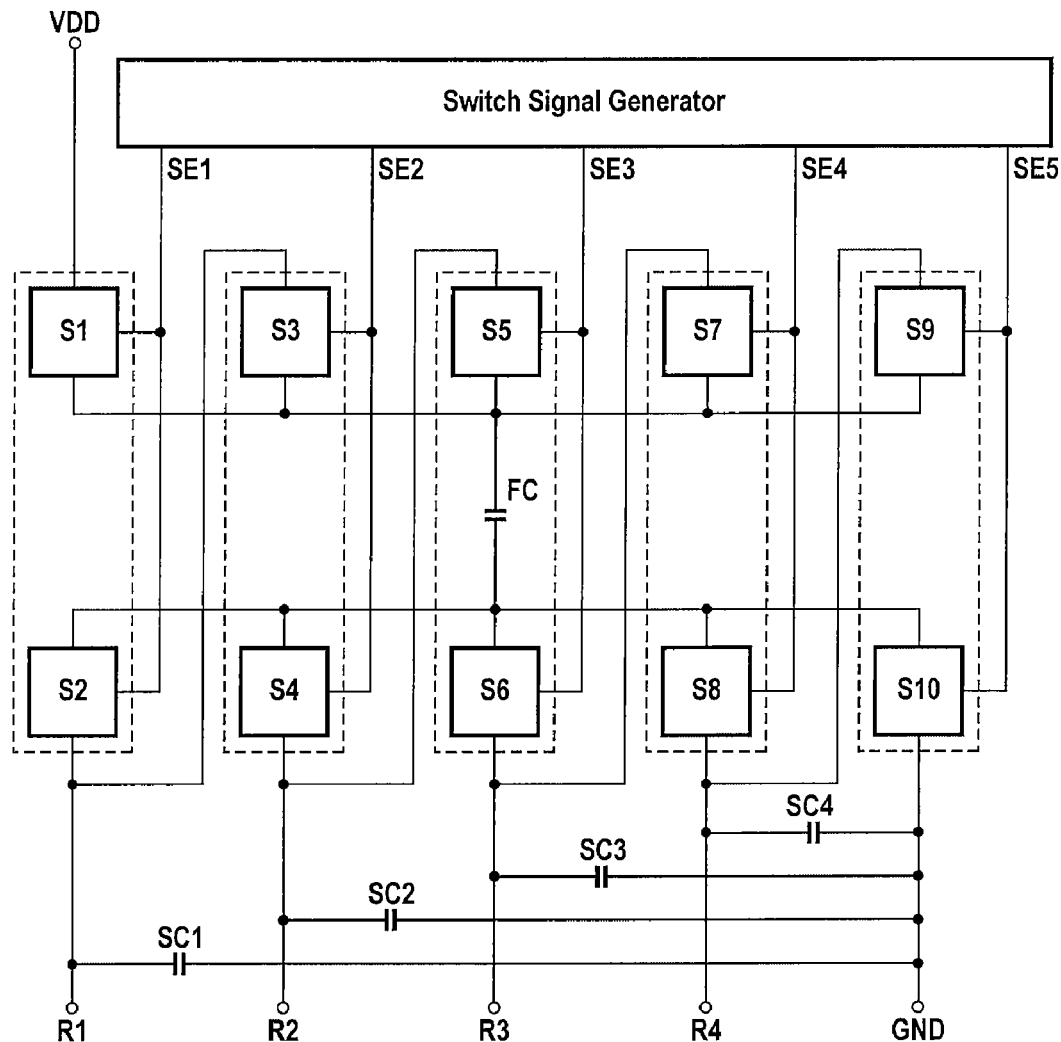
FIG. 14 shows a voltage rail generation circuit according to yet another embodiment of this invention.

FIG. 14 illustrates a rail generation system 50 according to yet another embodiment of this invention. The system includes five pairs of switches S1/S2, S3/S4, S5/S6, S7/S8, and S9/S10. A switch signal generator provides five non-overlapping switch enable signals SE1 through SE5, each enabling a respective pair of the switches. The switch signal generator may be implemented as any suitable circuit, state machine, or other mechanism, which generates non-overlapping switch enable signals.

The first switch of each pair couples the single, common flying capacitor to a unique high voltage rail, and the second switch of each pair couples the single, common flying capacitor to a unique low voltage rail.

The low voltage rail generated by one switch pair serves as the high voltage rail for the next lower switch pair. The first switch pair receives VDD and generates lower rail R1. The second switch pair receives rail R1 and generates lower rail R2. The third switch pair receives rail R2 and generates lower rail R3. The fourth switch pair receives rail R3 and generates lower rail R4. And the fifth switch pair receives rail R4 and GND. In the illustrated case where there are five switch pairs, the generated rails are on VDD/5 spacing intervals, such that R1=VDD*0.8, R2=VDD*0.6, R3=VDD*0.4, and R4=VDD*0.2.

Each switch pair, except the final one which is coupled to GND, has the output of its second switch coupled to GND through a dedicated storage capacitor SC1 to SC4.

CONCLUSION

Although the various embodiments of the invention have been discussed with respect to methodologies in which the switch enable signals are generated sequentially and serially and, therefore, the flying capacitor is jumped among the rail pairs in round robin fashion, in other embodiments (which may equally well be practiced using the circuitry shown in the drawings), the flying capacitor is jumped among the rail pairs in other manners. The switch enable signals need not necessarily be issued strictly in serial, sequential fashion, but may be issued in other orders, or randomly. The switch enable signals need not necessarily have the same duty cycle, nor the same frequency of issuance.

When one component is said to be "adjacent" another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

Although in various drawings there are specific numbers of rails actually illustrated, the invention may be practiced with any number of rails, each having their own load and their own storage capacitor.

Those skilled in the art, having the benefit of this disclosure, will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A voltage rail generation apparatus for generating N intermediate voltage rails between a first voltage reference (VDD) and a second voltage reference (GND) at N intermediate voltage rail outputs, where N is a positive integer greater than 1, the apparatus comprising:
   (A) a flying capacitor (FC) having a first FC terminal and a second FC terminal;
   (B) a plurality of switch pairs including,
      (i) a first switch pair including,
         a first switch (S1) coupling the first FC terminal to the first voltage reference, and
         a second switch (S2) coupling the second FC terminal to a highest (R1) of the intermediate voltage rail outputs,
      (ii) a last switch pair including,
         a first switch coupling the first FC terminal to a lowest of the intermediate voltage rail outputs, and
         a second switch coupling the second FC terminal to the second voltage reference, and
      (iii) N−1 intermediate switch pairs each including,
         a first switch coupling the first FC terminal to the second switch of a next higher switch pair, and
         a second switch coupling the second FC terminal to a next lower of the intermediate voltage rail outputs;
   (C) N storage capacitors each coupled between the second voltage reference and a respective one of the intermediate voltage rail outputs.

2. The apparatus of claim 1 further comprising:
   means for generating N+1 non-overlapping switch enable signals; wherein
   a first of the switch enable signals is coupled to operate the first switch pair;
   a next N−1 of the switch enable signals is each coupled to operate a respective one of the N−1 intermediate switch pairs; and
   a last of the switch enable signals is coupled to operate the last switch pair.

3. The apparatus of claim 1 wherein:
   N>3.

4. The apparatus of claim 1 wherein:
   N>4.

5. The apparatus of claim 1 wherein:
   N>5.

6. A voltage rail generation circuit comprising:
   a flying capacitor (FC) having a first FC terminal and a second FC terminal;
   a first switch pair (S1, S2) responsive to a first switch enable signal to couple the first FC terminal to a VDD voltage reference and to couple the second FC terminal to a first intermediate voltage reference terminal (R1);
   a second switch pair (S3, S4) responsive to a second switch enable signal to couple the first FC terminal to the first intermediate voltage reference terminal and to couple the second FC terminal to a second intermediate voltage reference terminal (R2); and
   a third switch pair responsive to a third switch enable signal to couple the first FC terminal to the second intermediate voltage reference terminal and to couple the second FC terminal to one of a third intermediate voltage reference terminal (R3) and a GND voltage reference signal.

7. The circuit of claim 6 wherein:
   the third switch pair comprises a final switch pair and is responsive to the third switch enable signal to couple the second FC terminal to the GND voltage reference.

8. The circuit of claim 6 wherein:
   the third switch pair comprises an intermediate switch pair (S5, S6) and is responsive to the third switch signal to couple the second FC terminal to the third intermediate voltage reference terminal; and
   the circuit further comprises,
   a fourth switch pair responsive to a fourth switch enable signal to couple the first FC terminal to the third intermediate voltage reference terminal and to couple the second FC terminal to one of a fourth intermediate voltage reference terminal (R4) and the GND voltage reference signal.

9. The circuit of claim 8 wherein:
   the fourth switch pair comprises a final switch pair and is responsive to the fourth switch enable signal to couple the second FC terminal to the GND voltage reference.

10. The circuit of claim 8 wherein:
    the fourth switch pair comprises an intermediate switch pair (S7, S8) and is responsive to the fourth switch signal to couple the second FC terminal to the fourth intermediate voltage reference terminal; and
    the circuit further comprises,
    a fifth switch pair responsive to a fifth switch enable signal to couple the first FC terminal to the fourth intermediate voltage reference terminal and to couple the second FC terminal to one of a fifth intermediate voltage reference terminal (R5) and the GND voltage reference signal.

11. A method of generating N intermediate voltage rails between a first voltage reference (VDD) and a second voltage reference (GND) at N intermediate voltage rail outputs, the method comprising, in response to serially, cyclically receiving each of N+1 non-overlapping switch enable signals:
    repeatedly coupling a same flying capacitor between sequential pairs of adjacent voltage rail outputs, such that,
       during a first time period the flying capacitor is coupled between the first voltage reference and a highest of the intermediate voltage rail outputs,
       during each of N−2 next time periods the flying capacitor is coupled between a next lower pair of the intermediate voltage rail outputs, and
       during an Nth time period the flying capacitor is coupled between a lowest of the intermediate voltage rail outputs and the second voltage reference;
    for each of the intermediate voltage rail outputs, storing charge between that intermediate voltage rail output and the second voltage reference;
    whereby VDD*N/(N+1), VDD*(N−1)/(N+1), and so forth are generated at respective ones of the intermediate voltage rail outputs.

12. The method of claim 11 further comprising:
    generating the N+1 non-overlapping switch enable signals; and
    sequentially, cyclically providing the switch enable signals to respective switch pairs coupled to selectably couple the flying capacitor as recited in claim 10.

13. A method of generating N intermediate voltage rails between a first voltage rail (VDD) and a second voltage rail (GND) by using a flying capacitor, the method comprising:
    (a) repeatedly receiving N+1 non-overlapping switch enable signals one at a time;

(b) in response to receiving any respective one of the switch enable signals,
  uncoupling the flying capacitor from any previously coupled pair of adjacent voltage rails, and
  coupling the flying capacitor between a pair of adjacent voltage rails associated with the respective switch enable signal;
(c) wherein N is an integer greater than 1; and
(d) wherein there are N+1 pairs of adjacent voltage rails, of which,
  a first pair includes the first voltage rail and a first one of the intermediate voltage rails,
  a last pair includes the second voltage rail and a second one of the intermediate voltage rails, and
  any remaining pair comprises a unique adjacent pair of the intermediate voltage rails.

14. The method of claim 13 wherein:
N is an integer greater than 2; and
the any remaining pair includes N−2 pairs of adjacent voltage rails.

15. The method of claim 13 wherein:
N is an integer greater than 3; and
the any remaining pair includes N−2 pairs of adjacent voltage rails.

16. The method of claim 13 wherein:
N is an integer greater than 4; and
the any remaining pair includes N−2 pairs of adjacent voltage rails.

17. The method of claim 13 wherein:
the switch enable signals are received serially and sequentially.

18. The method of claim 13 wherein:
over a period of more than ten seconds, the respective switch enable signals are received a substantially equal number of times each.

19. The method of claim 13 further comprising:
generating the switch enable signals.

20. The method of claim 19 wherein generating the switch enable signals comprises:
  adjusting an output impedance of one of the voltage rails by at least one of,
    adjusting a frequency with which that voltage rail's switch enable signal is generated with respect to a frequency with which other voltage rails' switch enable signals are generated; and
    adjusting a duty cycle of that voltage rail's switch enable signal with respect to a duty cycle of other voltage rails' switch enable signals.

* * * * *